United States Patent
Wald et al.

(10) Patent No.: US 9,857,579 B2
(45) Date of Patent: Jan. 2, 2018

(54) SYSTEM FOR MICROSCOPIC APPLICATIONS

(71) Applicant: Carl Zeiss Microscopy GmbH, Jena (DE)

(72) Inventors: Matthias Wald, Jena (DE); Renhu Shi, Göttingen (DE); Alexander Scheps, Adelebsen (DE); Harald Schadwinkel, Hanover (DE); Jörg Schaffer, Göttingen (DE)

(73) Assignee: Carl Zeiss Microscopy GmbH, Jena (DE)

( * ) Notice: Subject to any disclaimer, the term of this patent is extended or adjusted under 35 U.S.C. 154(b) by 174 days.

(21) Appl. No.: 14/683,007

(22) Filed: Apr. 9, 2015

(65) Prior Publication Data
US 2015/0293338 A1    Oct. 15, 2015

(30) Foreign Application Priority Data
Apr. 10, 2014    (DE) .......................... 10 2014 005 309

(51) Int. Cl.
*H04N 7/18*        (2006.01)
*G02B 21/00*       (2006.01)

(52) U.S. Cl.
CPC ..... *G02B 21/0076* (2013.01); *G02B 21/0032* (2013.01); *G02B 21/0044* (2013.01)

(58) Field of Classification Search
CPC ................................................. G02B 21/0032
See application file for complete search history.

(56) References Cited

U.S. PATENT DOCUMENTS 5,915,048 A  *  6/1999  Hill .......................... G06K 9/58
                                                       382/255
6,678,090 B2 *  1/2004  Spink ................. G02B 21/0012
                                                       359/369

(Continued)

FOREIGN PATENT DOCUMENTS

DE         19511937 A1     3/1995
EP          1145067 B1     1/2000

OTHER PUBLICATIONS

German Search Report for German Application No. 102014005309.1 dated Aug. 11, 2014.

*Primary Examiner* — Tracy Y Li
(74) *Attorney, Agent, or Firm* — Patterson Thuente Pedersen, P.A.

(57) ABSTRACT

A system for microscopic applications, including a rotating structural element that acts as a beam splitter and has reflecting and transmitting structures, and which is disposed in an intermediate image plane of the beam path conjugated with the object field, and by which the structure is imaged onto an object in the object plane. The fluorescent light reflected by the object, or caused by the illumination, strikes the structural element as well as an image processing module. The beam reflected and transmitted by the structural element is guided through the image processing module. The structural element is set at an angle to the vertical of the beam path. An optical adapter, which tilts the microscopic intermediate image onto the plane of the structural element acting as beam splitter, is disposed at the interface between the microscope and the image processing module.

7 Claims, 3 Drawing Sheets

(56) References Cited

U.S. PATENT DOCUMENTS

2001/0050758 A1* 12/2001 Suzuki ................... G02B 5/09
                                                      353/69
2012/0307259 A1* 12/2012 Leung ............... G01B 11/0608
                                                     356/603

* cited by examiner

SYSTEM FOR MICROSCOPIC APPLICATIONS

RELATED APPLICATIONS

This present application claims priority to German Application No. 10 2014 005 309.1, filed Apr. 4, 2014, said priority application being fully incorporated herein by reference in its entirety.

FIELD OF THE INVENTION

The invention relates to a system for microscopic applications, comprising a rotating structural element (spinning disk) which acts as a beam splitter and has reflecting and transmitting structures, and which is disposed in a plane (intermediate image plane) of the beam path conjugated with the object field, and of which the structure is imaged onto an object in the object plane, and the fluorescent light reflected by the object or caused by the illumination strikes the structural element as well as an image processing module (imaging module), wherein the beam reflected and transmitted by the structural element is guided through the image processing module in which the structural element is set at an angle to the vertical of the beam path.

BACKGROUND OF THE INVENTION

Confocal microscopes are known in which a punctiform light source is imaged onto an object, or a transferred circular and rotatable structural element located in a plane conjugated with the object field, with for example holes, grid lines or any other structures (spinning disk) is imaged onto the object and the fluorescent light reflected on the object or caused by the illumination falls onto the structural element again on the return path. Due to the reflecting patterned partially transmitting layer located on the structural element, the structural element acts as a beam splitter. Typically this layer is produced by metal vaporization, for example using chromium, silver, gold or aluminum. The metal layer is then highly reflective, whereas the gaps in the structure are highly transmitting.

If not only the transmitted light is used again for the imaging, the objective consists of guiding the reflected beam through the imaging module. For this purpose, according to the solutions of the prior art, the structural element is placed into the intermediate image plane at a sufficient angle with respect to the optical axis of the microscope system so that the reflected beam can be relayed separately from the transmitted beam. Furthermore the structural element can be oriented with respect to the optical axis so that disruptive reflections in the system are avoided.

A substantial disadvantage of the obliquely arranged structural element is that the structure imaged onto the object is also imaged obliquely, that is to say the object plane and the plane of the structural element are at an angle relative to one another. In the object space the resulting angle between these planes is dependent upon the magnification effected by the microscope optics. In this case the effect is that the structure in the object field does not act uniformly and differs as a function of the imaging scale.

A further disadvantage is that, depending upon the magnitude of the angle, the oblique position of the structural element of the depth of field of the imaging no longer gives the effect of the imaged structure for the entire object field, but only for a part of the object field for which the structural element is still located in the depth of field of the optical system. As a result of this it is not the object plane but a plane located at an angle thereto which is imaged. One side-effect is the lateral change in magnification over the image field, from image edge to image edge, or a trapezoid effect.

In DE 195 11 937 A1 an arrangement is described in which a structural element located vertically in the beam path produces a disruptive reflection. This reflection is not used as useful light. In this case the structural element is at an angle in the beam path which causes the reflection to be directed at a solid angle which does not contribute to the detected signal. Furthermore the solution includes the arrangement of a pair of prisms, wherein one prism lies along the beam path before the structural element and one prism is disposed after the structural element.

A disadvantage of this arrangement is that the reflected beam cannot be used further, since the prisms are disposed too close to the structural element, so that the reflected beam cannot be used further. Furthermore the prism arrangement is an integral component of the imaging system (imaging module), or of the tube unit.

A further considerable disadvantage is the imaging quality which is determined by the geometric arrangement of the prisms and is insufficient for the present application. In this case the principal errors are astigmatism and lateral chromatic aberration.

The arrangement implemented in EP 1 145 067 B1 involves a compromise in which the angle between the plane of the structural element and the intermediate image plane is chosen to be so great that, at a relatively low numerical aperture or resolving power of the entire system, the semi-field of view can be guided onto the detector without the above-mentioned effects occurring.

SUMMARY OF THE INVENTION

Starting from the disadvantages of the known solutions it is the object of the invention to make further developments to a system for microscopic applications so that in reflection and transmission the full field of view is transmitted onto the detectors at full numerical aperture.

According to embodiments of the invention, an optical adapter which tilts the microscopic intermediate image onto the image plane of the structural element acting as beam splitter is disposed at the interface between the microscope and the image processing module. In this case the microscope as well as the image processing module do not require any change to their internal optics, that is to say the beam path before and after the optical adapter in the microscope and image processing module remains unchanged.

The arrangement of the optical adapter according to embodiments of the invention produces a high image quality (Strehl definition brightness). The optical adapter is advantageously constructed as a prism arrangement. In an advantageous embodiment at the interface between the microscope and the image processing module with a tilting of the image plane by 8° the bending angle is approximately 4.5°.

If the entire field of view is not aligned within a depth of field along the orientation of the structural element, other angles can also be set which are better suited to any boundary conditions, for example of a structural nature. It is also conceivable that the angle is dependent upon the manufacturability of the prisms, the glass selection and permissible tolerances. Depending upon the application the optical adapter may be firmly or releasably connected to the image processing module. It may also be advantageous if the optical adapter is a component of the entire system comprising the microscope and image processing module. In this case only one single component would be from discernible from the exterior.

DETAILED DESCRIPTION OF THE DRAWINGS

Figure 1:
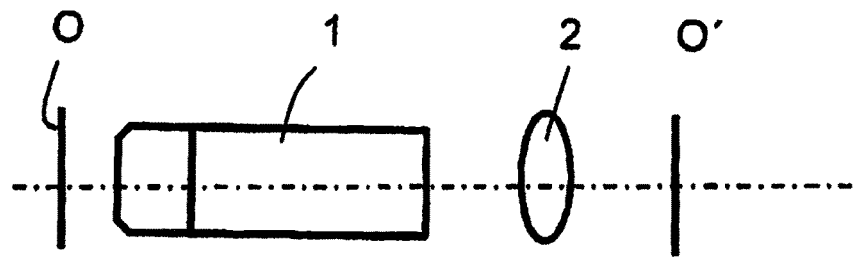
FIG. 1 depicts a schematic simplified representation of the system.
Figure 2:
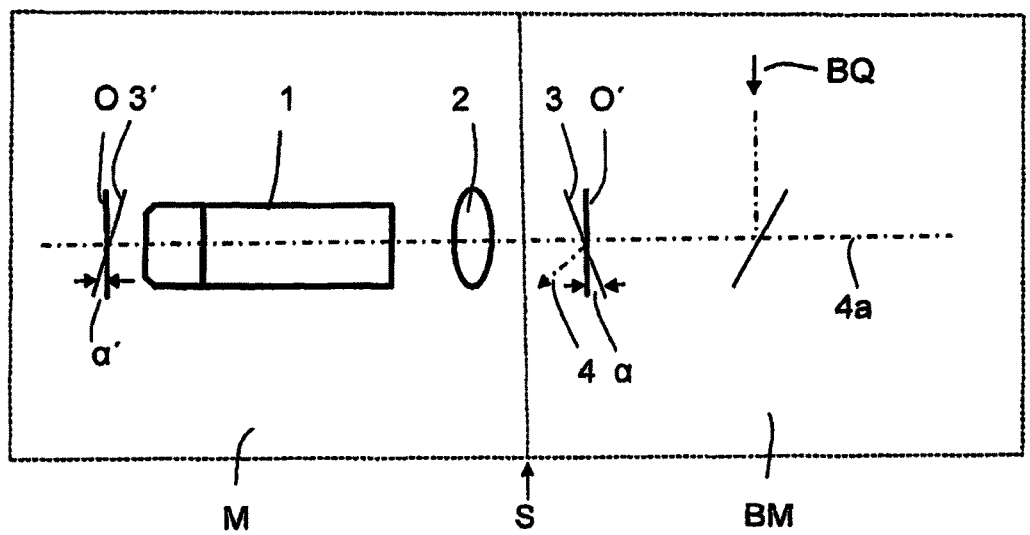
FIG. 2 depicts a schematic representation of the beam paths of the microscope and of the image processing module and the coupling thereof.

Starting from FIG. 1, in which a microscope M with an object plane O, an objective 1, a tube lens 2 and an image plane O' is represented schematically, FIG. 2 shows the coupling of this microscope to an image processing module BM. The interface S between the microscope M and the image processing module BM is located between the tube lens 2 and the image plane O' of the microscope M.

At the location of the image plane O' at a tilting angle α with respect to the image plane O' a structural element (spinning disk) 3 is disposed, the image 3' of which can be seen, by means of the transmitting component of the light component emanating from an illumination source BQ, in the object plane O at the opposite tilting angle α' modified by the scale of the optical system. The light component 4 reflected by the structural element 3 and the transmitted light component 4a are also shown.

Figure 3:
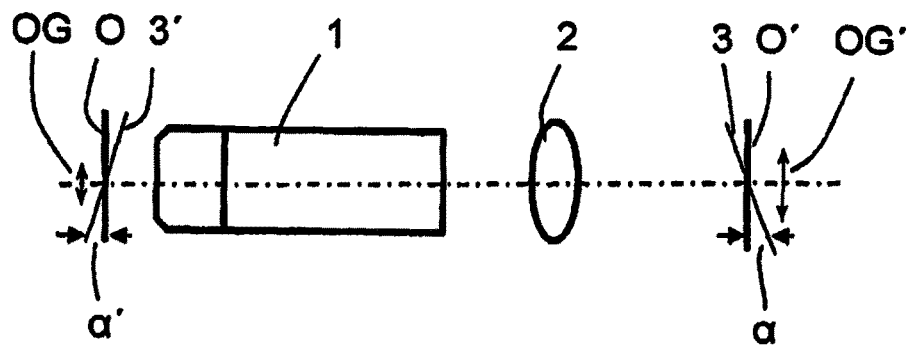
FIG. 3 depicts a schematic representation of the object field size and the image size.

FIG. 3 shows, in addition to the arrangement of the structural element 3 in the image plane O' and the image 3' thereof in the object plane O, the size of the object field OG in the object plane O by comparison with the size of the image OG' (conjugated image of the object field OG) in the image plane O'.

Figure 4:
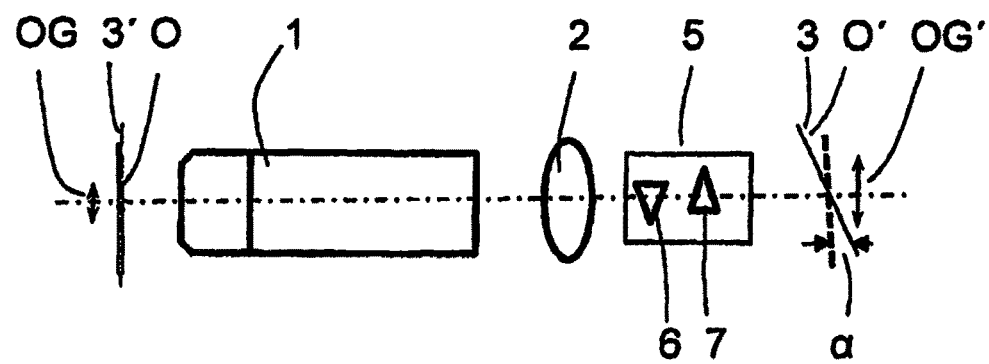
FIG. 4 depicts a schematic representation of the optical adapter.

FIG. 4 shows the arrangement of the optical adapter 5 with a prism arrangement consisting of two prisms 6 and 7. The optical adapter 5 is located between the tube lens 2 and the image plane O'. The effect of the optical adapter 5 is that the image 3' of the structural element 3 is no longer at the tilting angle α' with respect to the object plane O, but falls directly into the object plane O. The beam path STG is redirected by the arrangement of the prisms 6 and 7 by an angle β, which is illustrated in greater detail in FIG. 5.

Figure 5:
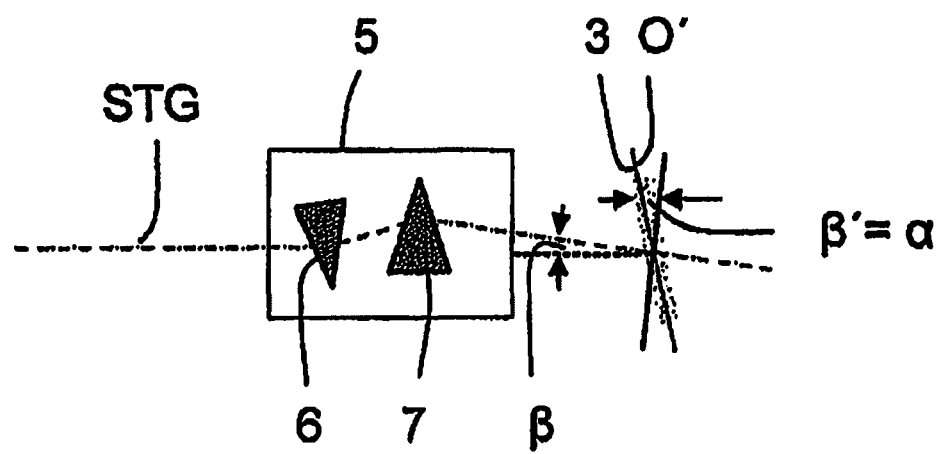
FIG. 5 depicts an enlarged representation of the optical adapter.

As already stated, FIG. 5 shows the more detailed view of the optical adapter 5 by which, by means of the prisms 6 and 7, bending of the beam path STG by an angle β and tilting of the image plane O' relative to the new position of the beam path STG by an angle α=β' occurs.

In this case, by means of the prism 7 the effect of the prism 6 can be compensated for with respect to coma and lateral chromatic aberration, but not with respect to the tilting of the image plane. This is possible, since the tilting of the image plane O' is not determined by the axial position of the prisms 6 and 7 or the spacing thereof, but only by the deflection angle. On the other hand, coma and lateral chromatic aberration also clearly react to the position of the two prisms 6 and 7. Thus, tilting of the image plane O' can be produced without coma and lateral chromatic aberration being generated, namely by means of the spacing of the two prisms 6 and 7 relative to one another and by means of the spacing relative to the image plane O' itself. Other aberrations are in any case small in the structure and are insignificant when viewed. With a bending angle β of 4.5° a tilting of the image plane O' is produced by the tilting angle β' of 8°. The bending angle β can be influenced by compromising the produced change of position of the image plane by the tilting angle β' or the imaging quality (aberrations).

The invention claimed is:

1. An image processing module for a microscope, comprising:
    a spinning disk element having reflecting and transmitting structures, arranged within an image plane of the microscope and at a tilting angle with respect to an optical axis of the microscope;
    means for guiding illumination light through the spinning disc element for illuminating an object by imaging a structure of the spinning disc onto an object placed in an object plane;
    means for guiding light reflected by the object or fluorescent light caused by illumination from the microscope to the image processing module;
    means for guiding light reflected and transmitted by the spinning disc through the image processing module to at least one image sensor; and
    an optical adapter arranged at an interface between the microscope and the image processing module, the optical adaptor comprising a prism arrangement configured to tilt the image of the spinning disc directly into the object plane perpendicular to the optical axis of the microscope.

2. The image processing module of claim 1, wherein the prism arrangement comprises a first prism and a second prism, wherein a beam path of the microscope is bent by the optical adapter at a bending angle.

3. The image processing module of claim 2, wherein the bending angle is about 4.5° and wherein the tilting angle is about 8° with respect to a vertical of the beam path.

4. The image processing module of claim 2, wherein the tilting angle is determined by deflection angles of the first and the second prism.

5. The image processing module of claim 4, wherein coma and lateral chromatic aberrations are minimized by spacing of the two prisms relative to each other and spacing relative to the image plane.

6. A modular microscope system, comprising:
    a microscope module having an object plane, an objective and a tube lens arranged in a beam path; and
    an image processing module having a spinning disk element with reflecting and transmitting structures arranged within an image plane of the microscope module at a tilting angle with respect to the image plane, means for guiding illumination light through the spinning disc for illuminating an object by imaging a structure of the spinning disc onto an object placed in the object plane, means for guiding light reflected by the object or fluorescent light caused by illumination from the microscope to the image processing module, means for guiding light reflected and transmitted by the spinning disc through the image processing module to at least one image sensor, and an optical adapter arranged at an interface between the microscope module and the image processing module, the optical adaptor comprising a prism arrangement configured to tilt the image of the spinning disc directly into the object plane of the microscope.

7. The system of claim 6, wherein the prism arrangement comprises a first prism and a second prism, wherein a beam path of the microscope is bent by the optical adapter at a bending angle and wherein the image processing module is fixed relative to the bending angle and with respect to the beam path of the microscope.

\* \* \* \* \*